United States Patent [19]

Gandrud et al.

[11] 4,152,884

[45] May 8, 1979

[54] LAWN MOWER WITH CATCHER ACCOMMODATION

[75] Inventors: Merlin H. Gandrud, Sturtevant; Neill C. Woelffer, Racine, both of Wis.

[73] Assignee: Jacobsen Manufacturing Company, Racine, Wis.

[21] Appl. No.: 818,168

[22] Filed: Jul. 22, 1977

[51] Int. Cl.² .................. A01D 53/08; A01D 53/06
[52] U.S. Cl. ...................... 56/202; 56/320.2
[58] Field of Search .......... 56/202, 203, 16.6, 13.4, 56/320.2, 320.1

[56] References Cited

U.S. PATENT DOCUMENTS

| | | | |
|---|---|---|---|
| 3,037,339 | 6/1962 | Nicholson | 56/13.4 |
| 3,065,588 | 11/1962 | Shaw | 56/13.4 |
| 3,112,590 | 12/1963 | Heth et al. | 56/202 |
| 3,367,091 | 2/1968 | Weiland | 56/13.4 |
| 3,636,686 | 1/1972 | Meyer et al. | 56/320.2 |
| 3,706,190 | 12/1972 | Taub | 56/13.4 |
| 3,872,656 | 3/1975 | Dahl | 56/202 |
| 3,893,284 | 7/1975 | Thon et al. | 56/202 |
| 3,928,956 | 12/1975 | Boyer | 56/202 |
| 3,949,540 | 4/1976 | Christopherson et al. | 56/202 |
| 4,043,102 | 8/1977 | Uhlinger et al. | 56/202 |

FOREIGN PATENT DOCUMENTS 402989  10/1968  Australia ................... 56/202

*Primary Examiner*—Russell R. Kinsey
*Assistant Examiner*—Paul J. Hirsch
*Attorney, Agent, or Firm*—Arthur J. Hansmann

[57] ABSTRACT

A lawn mower with catcher accommodation and having a mower housing and a rear portion on the housing extending along an upright plane transverse to the mower central axis. A handle is attached to the housing and extends rearwardly therefrom and the housing has a grass clipping discharge opening directed to the rear on the mower and to one side of the central axis. The mower has a vertically mounted hinged door extending over the discharge opening and being swingable to an open position and against a spring. A grass catcher can be mounted on the mower and it has an adapter abutting the mower and in contact with the spring-urged door which secures the catcher on the mower. The mower door has an impact panel therein for engaging the materials blown and thrown by the mower and against the door when the door is closed.

9 Claims, 12 Drawing Figures

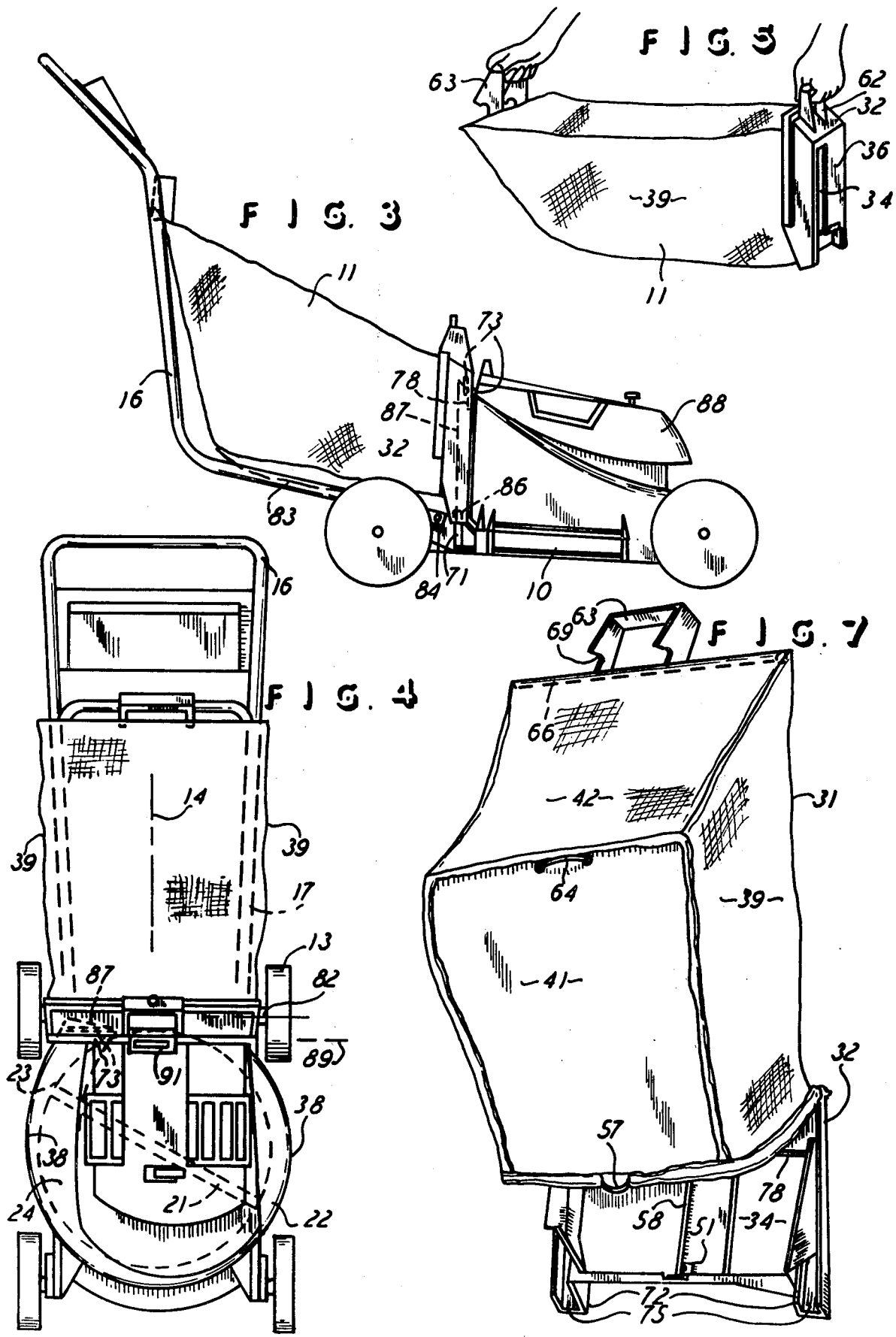

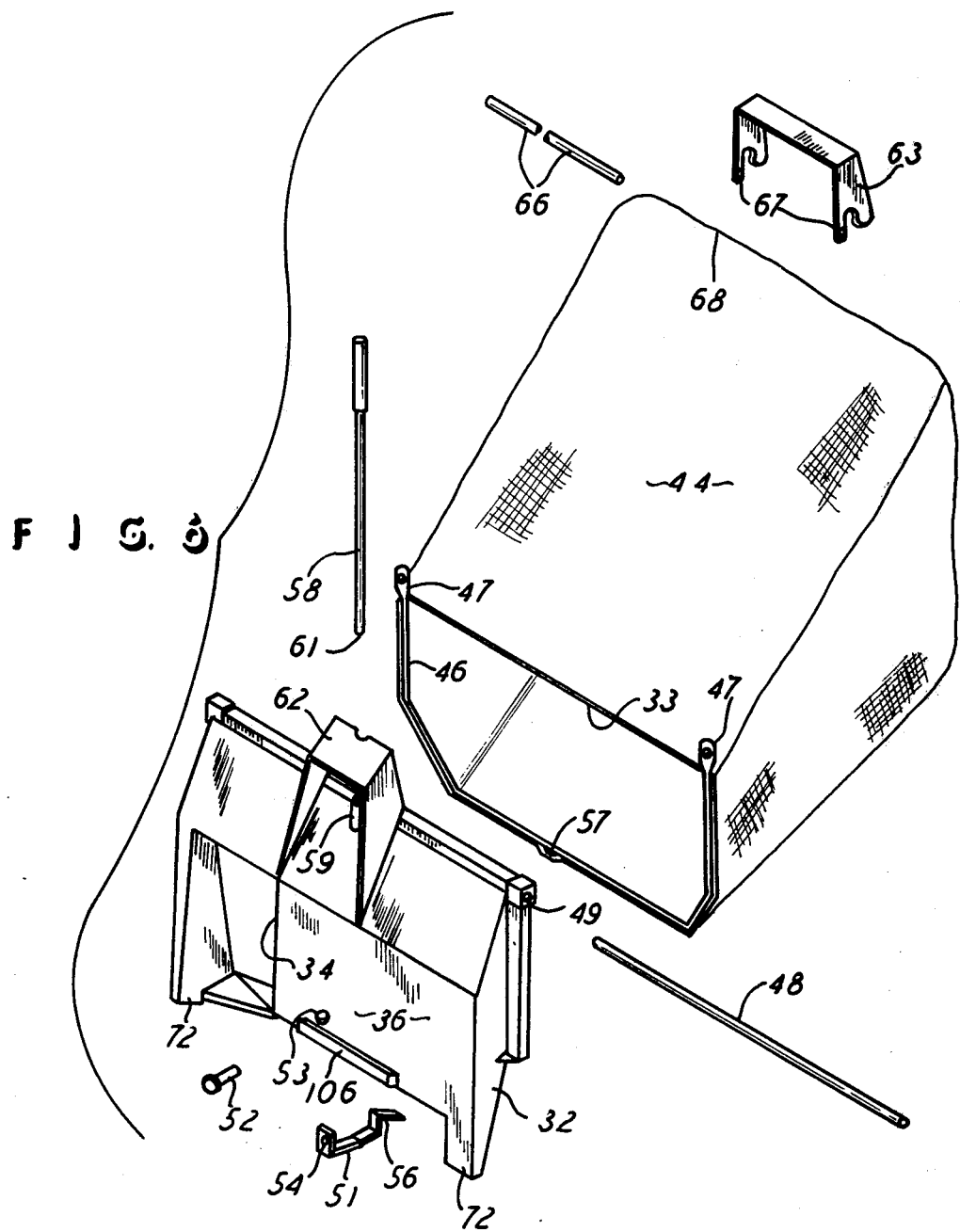

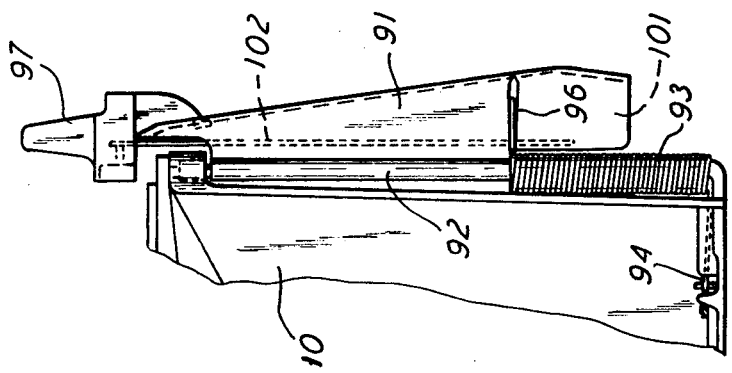
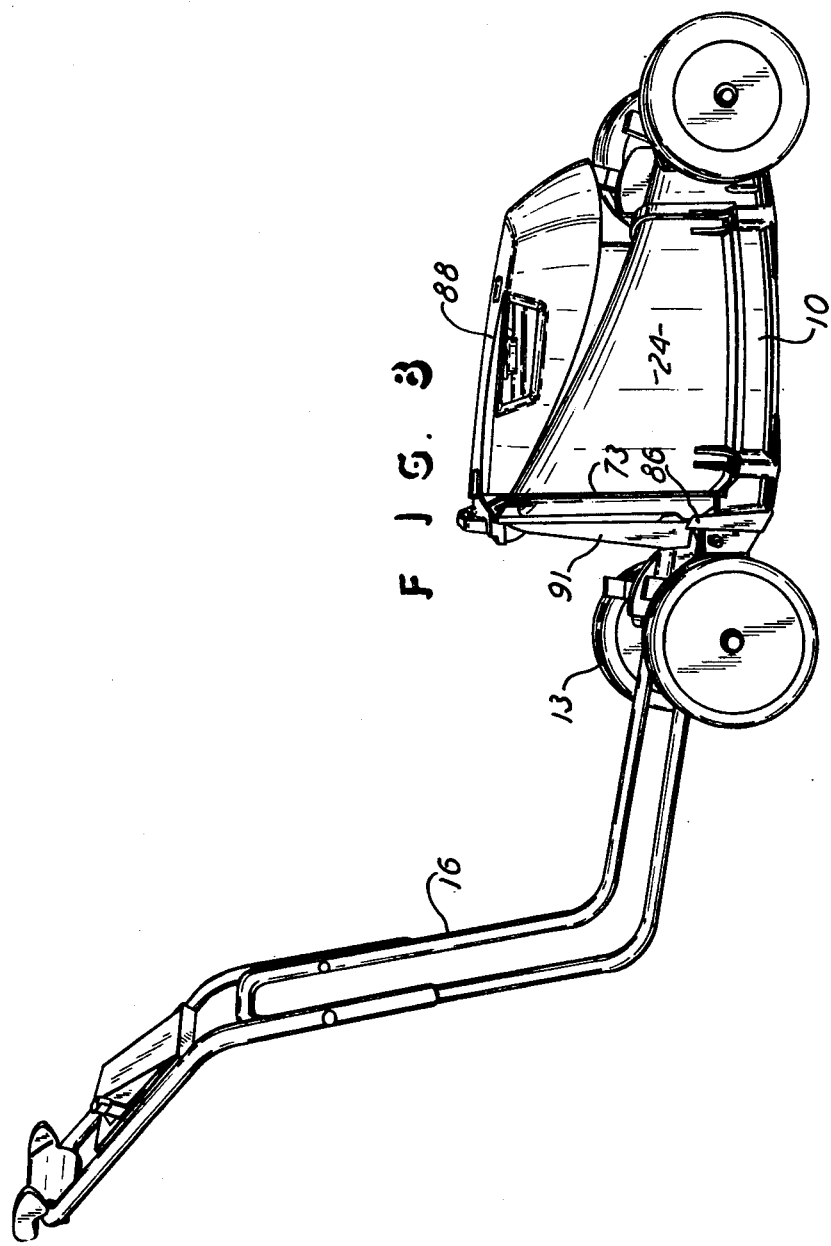

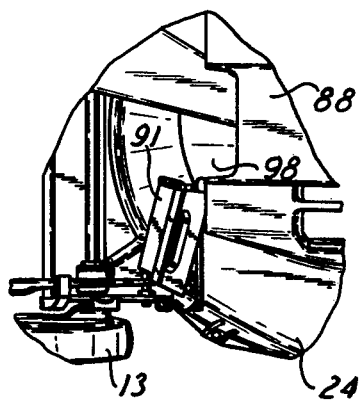
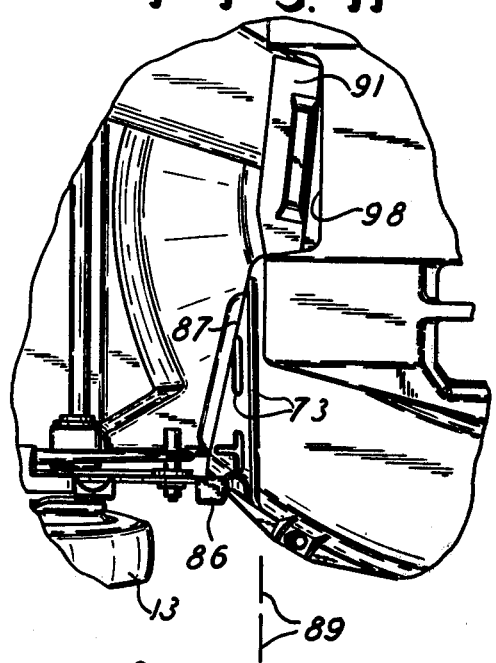
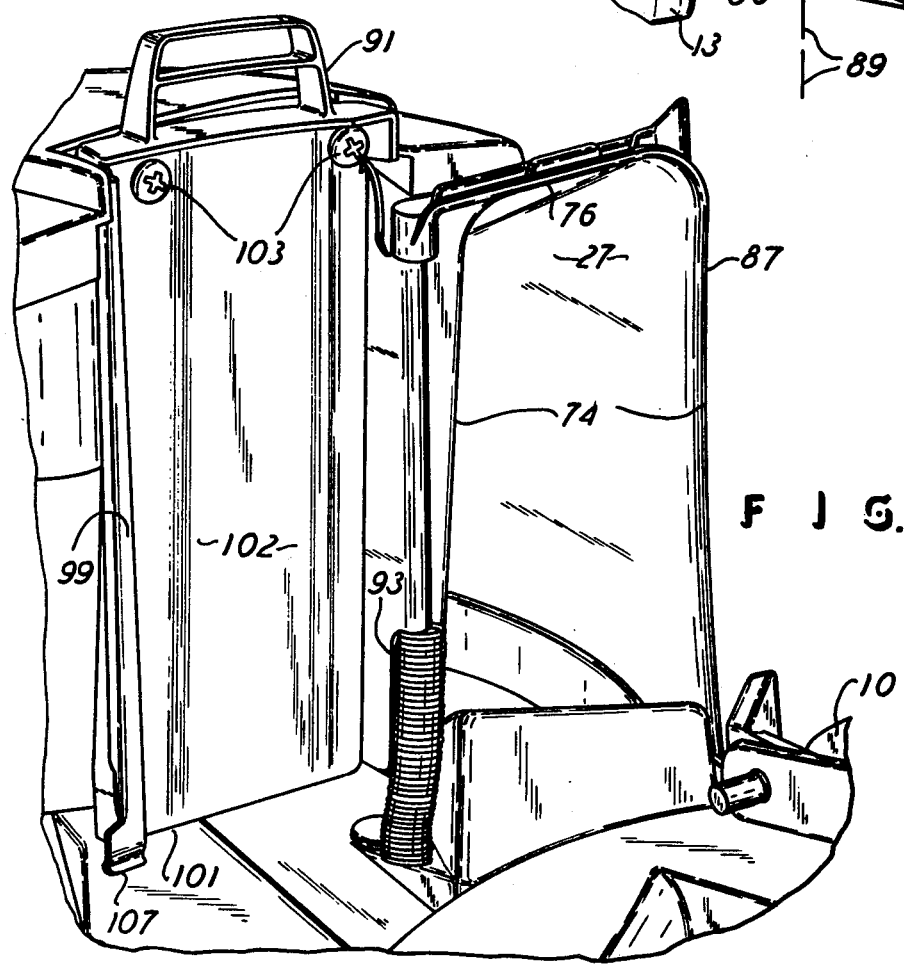

LAWN MOWER WITH CATCHER ACCOMMODATION

This invention relates to a lawn mower with catcher accommodation, and, more particularly, it relates to a rotary type of lawn mower with an accommodation for having a bag type of catcher mounted thereon.

BACKGROUND OF THE INVENTION

The prior art is already aware of rotary mowers having accommodations for attaching catchers, including bag-type catchers. Examples of such mowers are found in U.S. Pat. Nos. 2,973,614 and 3,112,597 and 3,192,692 and 3,706,190, for instance. Those prior art patents simply show the rotary type of lawm mower with a side discharge opening and a bag in grass flow communication with the discharge opening. The bag projects to the side of the mower, as mentioned, but, in some instances, the mower does have a spring-urged door which closes over the mower housing discharge opening when the bag is removed. Further, the prior art is aware of mowers which have discharge openings at the rear of the mower housing and which may be directed generally rearwardly of the mower, and U.S. Pat. Nos. 1,899,564 and 3,118,267 very generally show rotary mowers with discharge openings toward the rear of the mower. Still further, the prior art is already aware of rotary mowers with catchers which are mounted directly to the rear of the mower and in line with the mower, and Australian Pat. No. 402,989 and U.S. Pat. Nos. 2,720,071 and 2,910,818 and 2,983,095 and 3,065,588 and 3,919,370 and 3,568,421 and 3,636,686 are examples of that arrangement of the mower with the catcher directly to the rear thereof. Finally, the prior art is aware of rotary mowers with a discharge opening having a door thereon and mounted on an upright axis for swinging between an open and closed position over the discharge opening and being spring loaded, and U.S. Pat. No. 3,872,656 generally shows that arrangement.

However, the prior art does not show nor suggest a rotary type of lawn mower with a catcher accommodation wherein the mower discharge opening is directed rearwardly of the mower and along the lines of the mower handle and with the accommodation or the catcher arranged so that the catcher is within the lateral limits of the mower and can be readily and easily mounted on and removed from the mower and which has its forward mounting portion disposed forwardly on the whole unit for positioning the center of gravity of the entire unit forwardly and thereby rendering the mower of minimum material and light weight but yet of complete stability. Still further, the prior art does not suggest a type of mower wherein there is the spring-urged door extending over the mower discharge opening and swingable to an open position where the door engages the portion of the catcher adjacent the mower for securing the catcher to the mower, and thus making a dual use of the spring-urged mower discharge chute door, that is using it in both the closed and open positions. Still further, the prior art does not suggest a type of mower discharge door which is adapted and arranged to intercept and dampen the impact of objects moved through the mower by the rotation of the mower cutter, but yet allow the mower discharge to be exhausted from the mower by being directed downwardly below the door in a space therebelow. Accordingly, the present invention provides a rotary lawn mower which improves upon the aforesaid features and presents a mower which satisfies the deficiencies of the prior art as mentioned herein.

In summary, the present invention provides a rotary type lawn mower with catcher accommodation which is an overall improvement upon the prior art rotary mowers which have means for mounting catchers thereon and which actually have catchers removably mounted on the mowers. Accordingly, the present invention provides a rotary mower which is of light weight and minimum dimensions, particularly in the length of the mower, all achieved by means of having the members of the mower which engage the grass catcher located forwardly on the mower so that the center of gravity of the combined mower and catcher is forwardly located and thus the mower need not be of a large size or heavy weight simply to counterbalance an overhanging catcher when filled with grass clippings.

Other objects and advantages will become apparent upon reading the following description in light of the accompanying drawings.

BRIEF DESCRIPTION OF THE DRAWINGS

FIGS. 3 and 4 are side elevational and top plan views of the mower and catcher of FIG. 1.

FIG. 5 is a side perspective view of the catcher of FIG. 1 and removed from the mower.

FIG. 6 is an enlarged exploded view of the catcher of FIG. 1.

FIG. 7 is a bottom perspective view of the catcher of FIG. 1, and showing the door in the open position.

FIG. 8 is a side perspective view of the mower of FIG. 1 and with the catcher removed.

FIG. 9 is an enlarged side elevational view of the rear fragment of the mower of FIG. 1 and showing the chute door.

FIGS. 10 and 11 are enlarged top perspective views of the rear fragment of the mower of FIG. 1, and showing the chute door in the closed and open positions, respectively.

FIG. 12 is an enlarged rear perspective view of the rear fragment of the mower and showing the chute door in the open position.

DETAILED DESCRIPTION OF THE PREFERRED EMBODIMENT

Figure 2:
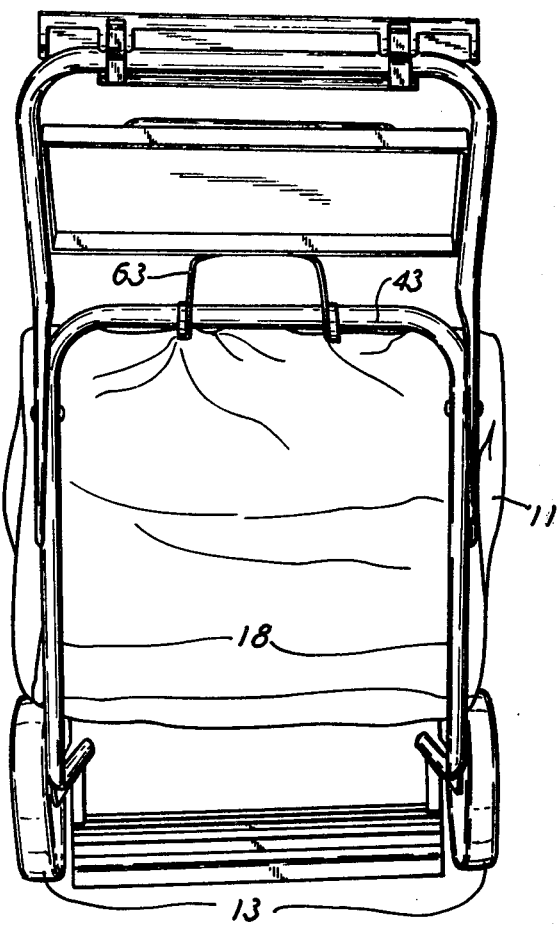
FIG. 2 is a rear perspective view of FIG. 1.

The first two sheets of drawings show a rotary type of lawn mower 10 and a bag type of grass catcher 11 mounted on the mower 10. The mower 10 is of a conventional rotary type having a horizontally rotatable grass cutting blade, and a prime mover 12 is included in the mower 10 which also has four ground wheels 13 supporting the mower for movement generally in the fore-and-aft direction which is along the longitudinal or fore-and-aft axis of the mower, as designated 14 in FIG. 4. A mower handle 16 is suitably attached to the mower to actually be pivotal thereon and to extend first in a horizontal portion 17 and then an upright portion 18 and up to a hand grip 19 where the operator can grasp the handle and steer the mower in the usual course of mowing. Thus, there is a rotary type of mower having a blade such as the blade designated 21 in FIG. 4 which is enclosed in the mower housing 22 and which rotates on a blade circle designated 23 in FIG. 4. Operation of the prime mover 12 causes the usual and well known rotation of the blade 21 and thus cuts the grass and directs it around the confining mower housing 22 and up into the discharge chute 24. The rearwardly extending chute portion 26 has a grass discharge opening 27, such as shown in FIG. 12, and the grass is thus directed from the mower housing 22 and rearwardly of the mower and generally along the line of the mower fore-and-aft axis 14 and thus into the catcher 11.

FIGS. 5, 6, and 7 show the catcher 11 removed from the mower, and it will be noticed that the catcher has a body portion 31 which is made of a fabric or air pervious material so that the flow of air generated by the operation of the mower 10 can be directed through the bag body portion 31, in the usual arrangement of a bag type of grass catcher. Also, the catcher 11 has a front portion 32 made of rigid material, and that may be a plastic material, and that portion extends throughout the cross-section of the bag 11 and thus throughout the front opening 33 of the body portion 31, as best seen in FIG. 6. The portion 32 is in the nature of a door or an adapter which accommodates the mounting of the catcher 11 on the mower 10, all in a manner described in detail hereinafter. At this time, it will be seen and understood that the adapter 32 has a grass inlet opening 34 at one side of its front wall 36, and that opening 34 is in grass flow communication and registry alignment with the mower opening 27 when the catcher 11 is mounted on the mower 10. Thus the grass clippings and the flow of air move from the mower housing 22 and through its chute 24 and the mower discharge opening 27 and through the catcher opening 34 and into the catcher bag or body portion 31, all in a desired arrangement. Grass clippings are therefore accumulated in the bag portion 31, but the flow of air is permitted to continue through the bag portion 31 so that the collection of clippings and the expelling of air can be a continuous process in the operation of the combined mower unit.

FIG. 4 further shows that the mower housing 22 has lateral side limits designated 38, and those locations are the extreme lateral sides of the mower housing 22 and they are in line with the front and rear wheels 13, all as seen in FIG. 4. Further, the drawings show that the catcher 11 is symmetrically aligned with the mower fore-and-aft axis 14 and has its opposite side walls 39 aligned with the mower lateral limits 38, and thus the catcher 11 does not occupy more lateral space than that occupied by the mower 10 itself and the catcher walls 39 are actually within the lateral limits of the mower wheels 13 and are substantially aligned with the mower housing sides 38, as mentioned and shown. Accordingly, the mower can be maneuvered when the catcher is on the mower, and the catcher does not project laterally of the mower and is therefore not in the way for trimming action by the mower and the catcher will not encounter obstacles on the side of the mower such as trees and bushes or the like.

The arrangement of the mower and catcher is such that the catcher extends rearwardly of the mower and within the lateral limits of the mower itself, and the mower handle has its substantially horizontal portion 17 extending underneath the catcher 11 to upwardly support the catcher 11, in the event that the catcher 11 is filled with a weight or is so arranged that the catcher bottom wall 41 will rest down on the handle portion 17. Also, the handle 16 is generally of a U shape and thus has its two side portions 17 and the two side portions 18 adjacent the catcher side walls 39 and adjacent the catcher back wall 42, all for serving as a frame or bumper-like structure protecting the catcher 11 from obstacles against which the mower could be directed in a steering or like action. Of course the mower handle grip portion 19 extends above the uppermost level of the catcher 11, and the catcher is in no way interferring with the maneuverability of the mower or with the operator's view of the ground over which the mower is to be moved. Thus, the handle 16 is arranged to have a substantially right angle beteen its lower portion 17 and its upwardly directed portion 18, and thus optimum maneuverability and efficient control is achieved through that type of handle arrangement, in addition to providing for better accommodation of the catcher 11 and actual physical protection and suport thereof, as described and as shown in the drawings. Therefore, the handle 16 has the two leg portions 17 and the two leg portions 18, as shown. Also, the handle 16 has a cross piece 43 which is located substantially intermediate along the length of the handle 16.

The catcher 11 presents an enclosure for the grass clippings, and thus it also has a top wall 44, and the catcher side walls, back wall, and top wall are preferably all of an air pervious fabric or canvas type material employed in the making of bag types of catchers, and actually the catcher bottom 41 can be of a wear-resistant and impervious material so that it will give a more rigid support to the bottom of the catcher and will resist the usual rotting and mildew problems of catchers. As mentioned, the catcher front opening 33 extends through the entire cross-section or girth of the front of the catcher 11, and also the door or adapter 32 extends through that full girth and is thus of the full width and full height of the catcher 11 at the front thereof. FIGS. 6 and 7 show the catcher includes a U-shaped rod 46 which is attached to the bag material and renders the front of the bag rigid and the rod upper ends 47 provide a hinge or pivot mounting for the catcher door 32, by means of the rod 48 extending through the U-shaped rod 46 and through an elongated opening 49 in the door 32. Further, the door 32 is hingedly or pivotally related to the remainder of the catcher 11 and thus swings between a closed position of FIG. 5 and an open position of FIG. 7, such as when the clippings are to be emptied from the catcher 11 and FIG. 7 shows the catcher in the designated vertical position where the clippings will fall from the catcher 11. A latch 51 is affixed to the door wall 36 by means of a fastener or rivet 52 extending through a hole 53 and into a hole 54 in the spring material latch 51. The latch 51 has an offset portion 56 which engages an offset portion 57 of the bag rod 46 to thereby hook onto the rod portion 57 and retain the door 32 in a closed position relative to the catcher bag portion 31.

To release the door 32 from its closed position and permit it to swing open, such as in FIG. 7, a release member or rod 58 extends through the catcher door 32, such as through the sleeve 59 on the door 32, and the rod 58 has its lower end 61 extend down to the latch 51 to thus force the latch portion 56 off the bag rod portion 57 and thereby permit the door 32 to swing open. In this arrangement, the entire front end or cross section or girth of the catcher is therefore opened and the clippings can be readily and easily removed from the catcher and will of course immediately fall from the catcher when the door 32 is opened by the simple expedient of depressing the release rod 58 to release the spring latch 51, as shown and as described.

Further, the catcher 11 is provided with three handles 62, 63, and 64, with the handles 62 and 63 being on the upper portion or top of the catcher 11 and with the handle 64 being underneath, as seen in FIG. 7. Therefore, as shown in FIG. 5, the operator's hands are seen supporting the catcher 11 in the horizontal or substantially operative position, rather than the emptying position of the catcher, and thus the catcher can be held and maneuvered for mounting on the mower and removal from the mower and for transport to a location for emptying the catcher. Thus, the handle 62 is affixed with the door 32 and extends adjacent the release rod 58 so that the operator can be holding the handle 62 with his fingers and yet have the thumb available for depressing the rod 58 when he desires to release the latch 51 for the emptying of the catcher.

FIG. 6 also shows that the handle 63 is attached as a part of the catcher 11 by means of a rod 66 which extends on the interior of the bag portion 31 and along the corner between the rear wall 42 and the top 44, and the handle 63 has holes 67 through which the rod 66 extends for making the interconnection between the bag portion 31 and the rod 66 and the handle 63. As such, the rod 66 gives rigidity to the bag at the juncture designated 68 which is the upper corner thereof. Other than that, the remainder of the bag portion 31 is free to fold or bend or flex, except of course for the front U rod 46 and the door 32, and thus the bag 11 can be easily manipulated for mounting and removal relative to the catcher and for storage or the like. Of course the bag portion 31 is affixed, such as by sewing, to the U-shaped rod 46, and thus the entire assembly and arrangement of the parts shown in FIG. 6 will be understood by one skilled in the art.

Also, the catcher three handles are spaced apart from each other and around the catcher 11 such that the two handles 62 and 63 serve for the mounting and removal of the cather relative to the mower and for carrying the catcher, and the handles 63 and 64 are available for holding the catcher in the emptying position of FIG. 7 when the door 32 has been released and permitted to swing open by gravity, since the handle 63 and the door hinge 48 are then in substantially the same vertical plane and thus holding the handle 64 will properly position the catcher 11 for complete and easy emptying.

It will also be seen and understood by one skilled in the art that the mower 10 and the catcher 11 have interengaging portions or members which readily and easily permit the mounting of the catcher 11 on the mower 10 and the readily and easy removal thereof. Thus, the door or adapter 32 is attached to the mower 10 at the rear thereof by simply sliding downwardly onto the mower 10, and the catcher handle 63 is simply positioned onto the mower handle crosspiece 43 for supporting the rear end of the catcher 11 relative to the mower 10. For this purpose, the catcher handle 63 has downwardly opened notches 69 which simply rest down on the mower handle crosspiece 43. As such, the catcher 11 has its portions or connectors for attaching to the mower 10, and the very same handles 62 and 63 which are gripped by the operator for positioning the catcher 11 relative to the mower 10 are also utilized for carrying the catcher 11, such as in FIG. 5, and thus maximum efficiency and ease of the entire function is achieved.

Figure 1:
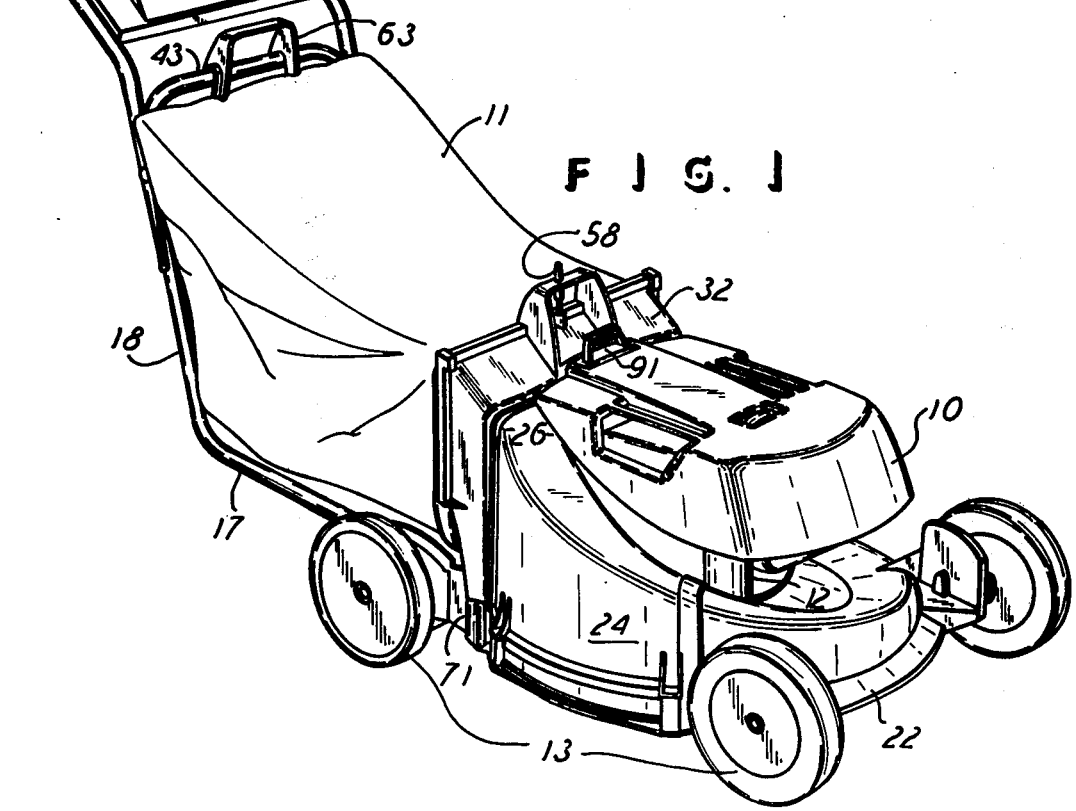
FIG. 1 is a front perspective view of a mower with a catcher made according to this invention.

The interconnection between the catcher adapter 32 and the mower 10 is by means of interconnecting members or tracks and projections between the mower and catcher. Thus, both opposite sides of the mower housing 10 have an upstanding block or member or attachment portion 71 which nests with the channel-shaped lower ends 72 of the adapter 32 to retain the adapter 32 forwardly on the mower 10 and at the lower end of the adapter 32. The mower chute end 26 has two spaced-apart tracks or attachment portions 73, with the forwardly-located track 73 extending vertically for the height of the chute end 26 and the rearwardly-located track 73 being a short track and extending spaced from the longer track 73, such as seen in FIGS. 3 and 8, for instance. Further, the chute end 26 is of a relatively narrow width, compared to the entire width of the mower 10, and it therefore has side walls 74 extending vertically and at the rear of the chute end 26 and defining the opening 27, along with the chute top wall 76, as shown in FIG. 12. With that arrangement, the adapter opening 34 can fit over the chute rear end 26 when the adapter lower ends 72 are aligned with the alignment and confining mower members 71, all for registering the adapter opening 34 with the chute discharge opening 27. Further, when the adapter 32 is positioned to its finally assembled and vertical position as seen in FIGS. 1 and 3, for instance, then the adapter wall edge 78 of FIGS. 3 and 7 will be received between the chute tracks 73 for aligning and positioning the adapter 32 in the grass-flow communication with the chute end 26, and the surfaces of the portions 71 and 73 which are in contact with the adapter 32, are named horizontally faced abutment surfaces. By virtue of the planar and rigid construction of the adapter 32, that is since it extends across the front of the bag portion 31, and by virtue of the adapter handle 62, the front end of the bag 11 can be readily and easily attached to and removed from the mower 10 by respective down and upward movements and the alignment and attachment is simply and readily accomplished. In the operation of attaching the adapter 32 to the mower 10, the rear end of the catcher 11 can be simply draped or supported on the mower handle crosspiece 43 by means of the catcher handle 63, and the operator can then release the handle 63 and have two hands available for controlling the adapter 32 and for controlling a chute closure door 91 which is described later. At this time it will be noticed and understood that the catcher 11 actually extends to within the vertical projection of the mower 10 and to a significant and substantial amount from the rear of the mower 10, as clearly shown in FIGS. 1, 3, 4, and as apparent from FIG. 8. That is, the adapter 32 is positioned in a vertical plane, and that vertical plane is actually forwardly of the axis designated 82 of the mower rear wheels 13. Still further, the vertical plane occupied by the adapter 32 is within the circle 23 of the rotation of the cutter blade 21, and that further physically describes and characterizes the unique forward location of the end of the catcher 11 which actually connects with the mower 10. To elaborate upon that physical relationship of the forward location of the catcher 11 relative to the mower 10, it is to be seen and understood that the mower chute rear end 26 terminates with its opening 27 which is substantially forwardly of the vertical plane of the mower rear wheels 13, and that vertical plane is also at least substantially coincident or within the cutter blade tip circle 23, as described and as indicated in FIG. 4. As such, in a standard 21-inch swath type of rotary mower, for instance, the mower discharge chute opening 27 is located approximately five or six inches in front of the vertical plane of the rear wheel axis 82, and the blade cutter circle tip 23 extends to within that vertical plane, that is it extends beyond the plane of the discharge opening 27. The arrangement therefore permits a significantly lower weight and therefore less material for the entire mower 10 since the combined mower 10 and bag 11 are of an optimum balanced arrangement with the center of gravity of the combination sufficiently balanced on the ground wheels 13 even when the bag 11 is filled with grass clippings. This permits the mower to be made of less material and lighter weight materials and it need not be of a size and weight to simply provide counterbalance for a bag full of grass clippings, and in actual practice, the mower housing 22 can be of a weight as low as 10 or 12 pounds, compared to approximately twice that weight for other mowers of comparable cutting capacities. Still further, the mower of this invention is of a length shorter than mowers of comparable capacities, and the amount of saving in overall length is as much as ten percent in that comparison. In summary, the mower of this invention is of a lighter weight, requires lesser materials and inherently materials of lighter weight, and the mower can be of a smaller size, including the length of the mower, all as compared to conventional and commercial mowers now on the market and of at least a comparable cutting capacity. In effect, the center of gravity of the combined unit of the mower and catcher of this invention is actually shifted forward and is therefore fully and stably balanced by the usual and conventionally-located ground wheels 13 which are located in their customary positions relative to a rotary mower housing, such as the housing 22.

With further regard to the relationship of the catcher 11 and the mower 10, it will be understood that the mower handle 16 protects and supports the bag 11, and FIG. 3 shows in dot-dash lines 83 the position that can be occupied by the catcher 11 at the bottom thereof, and thus the catcher 11 is supported by the mower handle 16 when necessary and appropriate, and that weight of the catcher 11 and its contents can be then transferred to the mower through the handle 16 and at its point of pivotal connection 84. Again, the point 84 is forward of the rear wheels 13, and the stability of the mower is thus enhanced and the shorter and lighter-weight mower 10 is therefore accomplished. That is, where the weight of the catcher 11 is suspended only from a rear portion of the catcher 11, such as at the catcher handle 63 on the mower handle cross piece 43, the mower 10 would be required to counterbalance all of that weight on the cross piece 43, but not in the present arrangement.

As shown and as mentioned above, the catcher adapter or door 32 readily and easily hooks onto the mower 10, and this is accomplished by having the adapter lower ends 72 channel-shaped, at 75 as seen in FIG. 7, and these channel shapes nest over the upstanding bosses 86, to thus secure and locate and anchor the lower end of the adapter 32 relative to the mower, 86 is the upper end of the boss 71. As previously mentioned, the adapter is also nested with the mower tracks 73 which protrude from the rear end 26 of the chute 24, and thus the adapter or door 32 simply slides down onto the chute 24 for ready and secure mounting on the mower 10. Thus, the adapter with its opening 34 surrounds the chute rear edge 87, and that edge 87 of course defines the chute rear discharge opening 27 which, as mentioned, is located forwardly of the blade circle 23, and thus the adapter front wall or panel 36 is also forwardly of the blade circle 23, all for the achievement of the lower weight and shorter length of mower 10, as mentioned. Of course the prime mover or engine 12 is disposed to be forward of the adapter 32, and the engine cover or shroud 88 is forward of the adapter 32. Thus, the mower 10 has a rear portion rearwardly disposed relative to that fore-and-aft axis 14, and the rear portion incorporates the chute rear end 26 and the rearwardly disposed end of the shroud 88, all as located along and defined by the transverse line designated 89 in FIG. 11. With that arrangement, the mower housing has its grass clipping discharge opening 27 directed rearwardly of the housing and toward the handle 16 and substantially in line with the handle 16 but located to one side of the central axis 14, and that is actually the right side of the mower 10 from the operator's position, and as shown in the drawings. Thus the line 89 represents an upright or even vertical plane at the rear of the mower 10 and extending transverse to the longitudinal axis 14 and being located as described and shown.

To assure versatility of the mower and compactness thereof a mower discharge opening door 91 is hingedly mounted on the mower at the rear thereof for swinging about a vertically-disposed hinge pin 92 shown in FIG. 9. The versatility is such that the mower 10 can be used without the catcher 11, and that is the mode shown in FIGS. 8 and 9 and 10 where the mower chute door 91 is in the spring-biased closed position over the chute opening 27. Of course when it is desired to use the catcher 11, then the door 91 is swung to the open position, shown in FIGS. 11 and 12, and then the discharge opening 27 is in grass flow communication with the catcher inlet opening 34 when the catcher is mounted on the mower 10.

Thus FIG. 9 shows the mower rear portion has the hinge pin 92 affixed thereon, and a coil spring 93 is piloted on the pin 92 and is anchored on its one end 94 and engages the door 91 at its other end 96, all to spring urge the door 91 to the closed position. A handle 97 on the upper end of the door 91 is available for swinging the door to the open position when it is desired to mount the catcher onto the mower 10. Further, the engine shroud 88 has a recess 98 which receives the door 91, as shown in FIGS. 11 and 12, when the door is in the open position and thus exposing the discharge opening 27 and moving out of the way of the adapter 32. Further, the arrangement is such that the door edge 99 is spring-urged toward the adapter 32 and will actually be pressing against th adapter front face 36, under the tension of the spring 93, and thus the adapter 32 is held into position by gravity and also by the pressure from the spring 93 applied through the door 91. Of course whenever the catcher 11 is not mounted on the mower 10, then the door 91 will immediately and automatically go to its closed position to thus be enclosed over the discharge opening 27 and preclude the movement of air and other material in the horizontal path through the opening 27.

In the closed position for the door 91, the air and grass and like material impelled by the rotating cutter-bar 21 will be directed through the chute 24 and against the door 91, and that material will be permitted to fall below the door 91 at the lower opening 101 defined by the channel shape of the door 91 at its lower end. That is, the impelled material will be directed to the door 91 and will fall to the inside of the door 91 and therebelow by means of a space or opening 101 defined by the three-sided channel-shaped door 91, as shown. Again, the extended door edge 99 will engage the chute edge 87 to thus provide the lower opening 101 between the door 91 and the mower itself, so that the air and grass and the like can actually fall through or below the door 91, as described in connection with the space 101.

In this aforesaid arrangement, the door 91 is hinged on the mower adjacent the central axis 14 so that the door swings toward the center of the mower and thus again presents the compact mower. Of course the door is capable of swinging through approximately 180 degrees so that the vertical rear plane 89 is maintained as shown and described in connection with FIG. 11, again for the functions described and the compactness of the entire unit.

Another feature is the provision of an impact panel 102 which is affixed to the door 91 by means of screws 103 and the panel is free to drape from the screws 103 and along the inside of the door 91, as shown in FIGS. 9 and 12. Thus, the panel 102 is made of a resilient but tough material to serve as an impact panel for objects striking the panel 102 and thereby dampen the flight of the object and any noise or like considerations. Thus the air moving through the chute 24 and against the dampening or impact panel 102, along with any objects moving against the panel 102 will lose their energy by displacing the panel 102 rearwardly within the door 91 and thus serve the purpose of dampening the effect of the flight but still permit the material to drop through the space 101, as mentioned. A further dampening effect is achieved through the arrangement of the spring 93 acting on the door 91 and that is against the force of the air and material moving through the chute 24 and toward the door 91. By virtue of the air space or gap 101, as described, only a minimal spring force 93 is required to hold the door 91 in the closed position as described, and thus the door 91 can function to dampen the force of material moving there against, also as described, and it can further function to exert the spring pressure against the adapter 32 when the door is in the open position and that spring pressure will not be excessive on the door 32 but will be adequate for holding the adapter or door 32 in the seated position described. The panel 102 is preferably made of a rubber or like material to serve as a dampener or impact panel as described and as shown.

Accordingly, it will be understood that the prime mover 12 is preferably a gasoline engine which therefore normally occupies a substantial amount of space, but the entire arrangement of the engine 12 and the housing 22 and the shroud 88 and the like are all such that the mower chute end 26 can terminate, and the shroud 88 can also terminate, along the plane designated by the line 89. Still further, for compactness and the functions mentioned, the mower handle 16 extends underneath the catcher 11 to be out of the way of the catcher 11 which is therefore not arranged, sized, and mounted simply to accommodate the mower handle. While the handle 16 is described as being pivotal relative to the mower, it is of course to be understood that the connection with the mower is actually a releasable pivotal connection such that the handle 16 is in a set position relative to the mower but can be released and then pivoted relative to the mower, in the usual arrangement of a pivotal handle on a rotary mower. Also, the catcher bottom 41 has been described as being of a material different from that of the remainder of the bag portion 31, and actually the bottom 41 is of a substantially rigid material which is self-suppoting and which will therefore remain significantly planar and will therefore give the flat configuration and support across the bottom of the catcher portion 31, and the actual material for the bottom can be a plastic material such as a polypropylene. Further, for purposes of intercepting materials moving through the chute 24 and into the catcher 11, the catcher rear wall 42 can be lined with an impact material (not shown) to intercept any objects moving forcefully into the catcher 11.

The adapter 32 has a projection 106 on its face 36, and the door 91 has a projection 107 extending toward the face 36 and in abutment with the projection 106 when the adapter is mounted on the mower. Thus the projection 107 is above and in contact with the projection 106 and holds the adapter 32 down and against unwanted raising and release of the adapter relative to the mower. However, the operator can lift the adapter 32 against the holding force of the projections to overcome same when it is desired to remove the catcher, and such overcoming is effected by the lifting of the adapter which causes it to press against the door 34 and against the force of the spring 93, for the release and removal described.

What is claimed is:

1. A lawn mower with catcher accommodation, comprising a mower housing having a fore-and-aft central axis and a rear portion rearwardly disposed relative to said axis and along an upright plane transverse to said central axis and said housing having opposite sides at the lateral limit positions of said housing and flanking said rear portion, a grass cutter bar in said housing, a handle attached to said housing and extending rearwardly thereof, said housing having a grass clipping discharge opening on said rear portion and directed rearwardly of said housing and toward said handle and being located on one side of said central axis, a door hingedly mounted on said housing on an upright hinge axis adjacent said central axis and extending in line with said upright plane of said housing rear portion to have said door extend over said discharge opening in the closed position and being hingedly movable off said discharge opening and through substantially 180 degrees, a spring on said housing and connected with said door to urge said door to its said closed position, grass catcher attachment portions spaced apart on said housing adjacent said upright plane and presenting horizontally faced abutment surfaces, and a bag type of grass catcher extending along said central axis and including an adapter of rigid material extending across one end of said catcher and with said adapter having a grass inlet opening extending through one side of said adapter and aligned with said discharge opening, said adapter extending along said upright plane and being removably attached to said mower housing by moving downwardly thereon in said upright plane and into contact with said attachment portions' abutment surfaces, said adapter being disposed to abut said door in the open position of said door and with said spring arranged to urge said door against said adapter to have the latter urged against said attachment portions and be held onto said mower through the spring force on said door.

2. The lawn mower with catcher accommodation as claimed in claim 1, wherein said catcher includes attaching members removably attached to said mower handle for supporting said catcher on said mower handle.

3. The lawn mower with catcher accommodation as claimed in claim 2, wherein said catcher is of a width to have the opposite sides thereof disposed on the vertical planes of the lateral limits of said mower housing.

4. The lawn mower with catcher accommodation as claimed in claim 1, wherein said mower housing includes a recess on the rear portion thereof for receiving said door in the open position of said door.

5. The lawn mower with catcher accommodation as claimed in claim 1, wherein said catcher adapter is hingedly attached to the remainder of said catcher for opening to empty said catcher.

6. The lawn mower with catcher accommodation as claimed in claim 1, wherein said grass cutter bar in said housing has a cutting circle of movement, said upright plane being located within the cutting circle of said cutter bar for locating the center of gravity of said mower and said catcher in a location toward the center of rotation of said cutter bar.

7. A lawn mower with catcher accommodation, comprising a mower housing having a grass discharge opening therein, a grass cutter in said housing, a door hingedly mounted on said housing and extending uprightly across said discharge opening in a closed position of said door relative to said discharge opening and said door being movable away from said discharge opening to an open position, a spring engaged with said door for urging said door to the closed position, and an impact panel attached to said door and extending on the inside thereof in the closed position and within the lateral limits of said door and across said discharge opening and being spaced from the uprightly extending said door through the extent of said panel across said discharge opening and being free of any openings in the extent across said discharge opening, for intercepting objects moving in said discharge opening and when said door is closed.

8. The lawn mower with catcher accommodation as claimed in claim 7, wherein said door and said mower housing are arranged with a space therebetween at an edge of said door for the escape of material from said mower and past said door when said door is closed.

9. The lawn mower with catcher accommodation as claimed in claim 7, wherein said panel is of a resilient material for dampening the impact of objects thrown thereagainst in the operation of said mower.

* * * * *

UNITED STATES PATENT AND TRADEMARK OFFICE
CERTIFICATE OF CORRECTION

PATENT NO. :  4,152,884
DATED     :  May 8, 1979
INVENTOR(S) :  Merlin H. Gandrud, Neill C. Woelffer It is certified that error appears in the above-identified patent and that said Letters Patent are hereby corrected as shown below:

Column 1, line 32, "3,919,370", should read -- 3,191,370 --

Signed and Sealed this

Thirty-first Day of July 1979

[SEAL]

Attest:

Attesting Officer

LUTRELLE F. PARKER
Acting Commissioner of Patents and Trademarks